US006705753B2

(12) United States Patent
Behling

(10) Patent No.: US 6,705,753 B2
(45) Date of Patent: Mar. 16, 2004

(54) EXTRUDER COMPRISING BLISTER MECHANISM

(75) Inventor: Michael Behling, Hameln (DE)

(73) Assignee: Berstoff GmbH, Hannover (DE)

( * ) Notice: Subject to any disclaimer, the term of this patent is extended or adjusted under 35 U.S.C. 154(b) by 0 days.

(21) Appl. No.: 10/203,717

(22) PCT Filed: Feb. 1, 2001

(86) PCT No.: PCT/DE01/00486

§ 371 (c)(1),
(2), (4) Date: Aug. 13, 2002

(87) PCT Pub. No.: WO01/62469

PCT Pub. Date: Aug. 30, 2001

(65) Prior Publication Data

US 2003/0012077 A1 Jan. 16, 2003

(30) Foreign Application Priority Data

Feb. 24, 2000 (DE) ........................................ 100 09 843
Dec. 5, 2000 (DE) ...................................... 100 610 345

(51) Int. Cl.[7] ................................................ B29B 7/48
(52) U.S. Cl. ............................. 366/85; 366/83; 366/89
(58) Field of Search ......................... 366/79–85, 88–90, 366/91, 302, 307; 425/204, 208, 209

(56) References Cited

U.S. PATENT DOCUMENTS 3,122,789 A * 3/1964 Coffee
3,337,222 A * 8/1967 Smith et al.
3,870,285 A * 3/1975 Bausch et al.
3,981,658 A * 9/1976 Briggs
4,136,968 A * 1/1979 Todd
4,332,481 A * 6/1982 Inoue et al.
4,462,691 A * 7/1984 Boguslawski
5,145,251 A * 9/1992 Shirato et al.
5,335,991 A * 8/1994 Wobbe
5,672,005 A * 9/1997 Fukui et al.
5,906,435 A * 5/1999 Callaghan et al.
6,206,560 B1 * 3/2001 Meyer et al.
6,238,079 B1 * 5/2001 Watada et al.
6,280,074 B1 * 8/2001 Kuroda et al.

FOREIGN PATENT DOCUMENTS

DE 19831540 * 1/2000
EP 588008 * 3/1994
EP 1048433 * 11/2000
JP 4-14412 * 1/1992
JP 4-22607 * 1/1992

* cited by examiner

*Primary Examiner*—Charles E. Cooley
(74) *Attorney, Agent, or Firm*—Cohen, Pontani, Lieberman & Pavane

(57) ABSTRACT

An extruder for polymer melts, with an extrusion space arranged in an extruder barrel and through which at least one extruder screw shank extends so that it can be rotated by a motor. The screw shank has at least one section in the form of a cylinder casing, the extrusion space having at least one barrel section which surrounds the cylinder casing in an essentially equidistant manner to form an encircling gap as a restricted flow zone (blister), in particular to set the pressure of the melt. The clearance of the encircling gap at the restricted flow zone can be changed in a specifically selective manner by externally adjustable force, with elastic deformation of the inside surface of the extrusion space and/or of the surface of the screw shank, by a hydraulic pressure chamber provided in the region of the restricted flow zone in the wall of the barrel section and/or in the least one screw shank. The pressure chamber has on the side facing the extrusion space a considerably smaller wall thickness (membrane wall) in comparison with the wall thickness of the extrusion space. A hydraulic pressure unit supplies the force for the surface deformation.

18 Claims, 4 Drawing Sheets

EXTRUDER COMPRISING BLISTER MECHANISM

PRIORITY CLAIM

This is a U.S. national stage of application No. PCT/DE01/00486, filed on Feb. 1, 2001. Priority is claimed on that application and on the following application: Country: Germany, Application No.: 100 09 843.6, Filed: Feb. 24, 2000.

BACKGROUND OF THE INVENTION

1. Field of the Invention

The invention relates to an extruder, in particular for processing polymer melts, with an extrusion space which is arranged in an extruder barrel and through which at least one extruder screw shank extends in such a way that it can be rotated by a motor, said screw shank having on it at least one section in the form of a circumferential bulge, the extrusion space having at least one barrel section which surrounds in an essentially equidistant manner the at least one extruder screw shank in the area of the at least one circumferential bulge to form an annular gap as a restricted flow zone (blister), in particular to set the pressure of the melt.

2. Description of the Related Art

An extruder of this type is disclosed by U.S. Pat. No. 4,332,481.

Such a restricted flow zone formed as an encircling gap, for example as an annular gap, in the extrusion space is also referred to as a blister and serves in particular for setting the pressure of the melt processed in the extruder. Downstream of this restricted flow zone, entraining agents may be added for example, being incorporated into the expanding polymer melt and serving as stripping agents. The effect of the blister is strongly dependent on the clearance in the annular gap between the cylindrical part of the extruder screw and the inside surface of the cylindrical extrusion space. In practice, the clearance is often of the order of approximately 3 mm. The optimum clearance is dependent less on the size of the respective extruder than on the properties of the material to be processed (temperature, viscosity). According to the prior art, changing of the clearance often involves a corresponding change of the screw shank or the cylindrical part of the screw shank in the region of the restricted flow zone. The processing of different materials therefore frequently requires the screw shank to be changed in order that best possible processing conditions can be set. In the case of non-steady-state processes during processing, the optimum size of the annular gap of the blister changes. Until now there has been no possible way of optimizing the clearance in such a situation. In particular during start-up operations, in which the extruder has not yet reached a constant operating temperature, changes in the effective clearance of the blister may be brought about by different degrees of thermal expansion. It has so far also not been possible to deal with this in an optimum way.

DE 198 31 540 A1 discloses a device for partially changing a closed flow channel cross section, the inner contour of which is formed by a displacement element, for example of a cylindrical shape. The flow channel is preferably part of an extrusion die for producing a tube from flowable compositions. The device has external adjusting elements in the form of pins which can be adjusted radially from the outside inward and at least one region of a flow channel wall which comprises a sleeve with a wall thickness of at most 1 mm, the sleeve being locally deformable inward by means of the adjustable pins. The displacement element arranged in the flow channel may likewise be provided with a sleeve of a small wall thickness, which is locally deformable outward by means of supporting elements that are axially displaceable on conical supporting surfaces. In this way, the flow channel cross section can be reduced in a specifically selective manner in the region of the thin flow channel wall. A disadvantage of this known device is that the adjustable pins and displaceable supporting elements do not allow uniform deformation over the cross section of the flow channel, since the introduction of the deforming forces can only ever take place in a punctiform or locally limited way. The greater the number of elements used for the deformation, the more uniformly the deformation can be set, but the greater the actuating effort for these elements as well. Another disadvantage is that the thin walls of the sleeves are unavoidably deformed by the melt pressure prevailing in the flow channel counter to the force of the elements used for the adjustment. Consequently, it is impossible for the device to be operationally used under geometrical conditions of the entirely unloaded state (zero position).

Further possibilities emerge from JP-60002329, where regions of an extruder barrel which can be elastically deformed by adjusting devices and interact with screw segments to produce an adjustable restricting gap are provided, or from U.S. Pat. No. 3,122,789, which shows a membrane which can be elastically deformed by a pressure fluid to adjust the flow channel height in a slot die.

SUMMARY OF THE INVENTION

It is an object of the invention to develop an extruder of the type stated at the beginning to the extent that a largely optimum mode of operation in the region of the blister is possible even if different materials are to be processed or the material properties change, without any major modification work being required for the extruder. The effort for the adjustment of the blister is to be as little as possible.

This object is achieved in the case of an extruder of the generic type by the clearance of the encircling gap at the blister being able to be changed in a specifically selective manner by externally adjustable force, with elastic deformation of the surface of the extrusion space and/or of the screw shank. For this purpose, the invention provides a hydraulic pressure unit which supplies the force for the surface deformation in the region of the restricted flow zone either on the inside surface of the extrusion space or on the circumferential bulge of the at least one screw shank or else on both, a hydraulic pressure chamber being provided in the region of the restricted flow zone in the wall of the barrel section where the blister is to be arranged and/or in the circumferential bulge of the at least one screw shank. The pressure chamber has on the side respectively facing the extrusion space a considerably smaller wall thickness in comparison with the wall thickness of the extrusion space. This wall is referred to hereafter as a membrane wall because of its small thickness.

The pressure chamber is expediently provided respectively in said barrel section of the extruder barrel and not on the screw shank. The reason for this is primarily to be seen in the fact that, because of the associated sealing problems, it is more difficult to provide a supply of hydraulic pressure medium to the pressure chamber on the screw shank than on the extruder barrel, which unlike the screw shank is completely immovable.

The invention can be realized particularly advantageously in the case of a single-screw extruder, which has a purely cylindrical extrusion space, with the result that the encircling gap at the blister is formed as an annular gap. The hydraulic pressure in the pressure chamber allows the membrane wall to deform to the respectively desired dimensions in a geometrically very uniform shape (circular shape). The desired settings can be controlled extremely quickly and easily, since all that matters is the difference in pressure between the hydraulic pressure and the pressure in the extrusion space.

However, the invention can also be applied very advantageously in the case of twin-screw extruders. In these extruders, the extrusion space is formed by two longitudinal bores which overlap partially in cross section, at least over part of the axial length of the extruder barrel, and because of their shape are also referred to as a "spectacle-bore". Arranged in this spectacle-bore are two co-rotatable or counter-rotatable motor-driven screw shanks which lie parallel to each other and each have at least one circumferential bulge. The circumferential bulges of the two extruder screw shanks in this case respectively lie directly next to each other. If the pressure chamber is not arranged respectively on the two extruder screw shanks but is provided on the inside surface of the barrel of the extrusion space, that is to say in the spectacle-bore, it is recommendable not to form the pressure chamber as a completely encircling chamber but to divide it into two separate chambers which are arranged mirror-symmetrically in relation to each other and, in the cross section of the extruder barrel, extend only in each case over by far the greater part of the circumferential bulges of the longitudinal bores (spectacle-bore), with the two interstitial regions being cut away. Consequently, in the transitional region between the two longitudinal bores, the two chambers are not contiguous.

A particularly advantageous embodiment of the invention in the case of a twin-screw extruder is obtained by providing a special barrel section which, instead of a spectacle-bore, has two corresponding fully cylindrical, i.e. not overlapping, longitudinal bores for the two screw shanks, these longitudinal bores of course having a smaller diameter than the respective partially cylindrical overlapping bores of the spectacle-bore. The diameter of the fully cylindrical bore preferably corresponds in each case to the root diameter of the respective screw shank, that is to say is only slightly larger than the latter. In this embodiment, in this special barrel section there is consequently a material bridge between the two longitudinal bores at the location corresponding to the interstitial region of the spectacle-bore. Respectively arranged in the surface of the longitudinal bore in this barrel section is a hydraulic pressure chamber, which is designed such that it runs all the way around in the same way as in the case of the embodiment for a single-screw extruder. This solution permits a completely uniform setting of the respective annular gap over the entire circumference. The pressure chambers of the two longitudinal bores can be partitioned off fully from each other, but may also be directly connected to each other in conducting terms.

Since the parts of the screw shanks provided with flights have a greater outside diameter than the fully cylindrical longitudinal bores of the special barrel section, they cannot be pushed through the latter during assembly. Therefore, either the barrel section must be of a divided design, which would correspondingly also require division of the hydraulic pressure chamber in the longitudinal bore, or the screw shank is respectively divided into axial portions which can be coupled together, for example by means of plug-in connections. It is also possible to use screw elements with a central through-bore, which are pushed into the extruder barrel from both ends of the latter and are subsequently securely connected to each other by means of a tension rod passed through the through-bore.

It is recommendable to arrange the pressure chamber of the blister in a separate, essentially annular part of the barrel which has only a short axial length, consequently the length of which is less than the inside diameter of the extrusion space. This annular barrel part is expediently connected to the other parts of the extruder barrel by a flange connection.

It is conducive to aspects of production engineering if the pressure chamber is made as a welded structure. In this case, the welds should advantageously be provided outside the membrane wall in thicker-walled regions, in order as far as possible not to allow the membrane wall itself to get into the zone of thermal influence of the weld, which could change its material properties unfavorably.

The membrane wall should be dimensionally designed for a difference in pressure of at least 100 bar, preferably of at least 150 bar. In any case, it must be ensured that the forces on the membrane induced by the hydraulic pressure applied in the pressure chamber lead only to elastic deformations, but not to plastic deformations. Furthermore, the loading should lie below the critical buckling load, in order that there is no wave-like deformation in the circumferential direction on the membrane wall which is arranged on the inside surface of the extrusion space. This is because it would mean that the effective clearance of the blister varies in the circumferential direction. In practice, the expedient thickness of the membrane wall lies in a range from approximately 0.5 to 3 mm, preferably in the range from 1 to 2 mm. However, these figures are not to be regarded as restrictive. In principle, the degree of deformation not only depends on the thickness of the membrane wall and the applied pressure in the pressure chamber but is of course also strongly influenced by the axial length of the membrane wall, i.e. by the length of the extent of the pressure chamber in the direction of the axis of the screw shank. The longer the membrane wall, the greater the deformation under the same pressure.

The invention can be used with particular advantage on an extruder in which a multi-screw extruder section is arranged downstream of the blister in the direction of material flow. This multi-screw extruder section may be designed in particular as a planetary-gear extruder section.

By providing an extruder with, a blister in the way according to the invention, allowing the effective clearance of the annular gap to be changed unproblematically at any time in a simple, specifically selective manner by elastic deformation through a force which can be adjusted from outside, it is possible without changing the screw shank to process different materials under optimum process conditions, provided that the remaining screw shank elements are suitable in principle for the respective material. In the case of non-steady-state processing conditions, it is possible in the course of operation to make an optimum choice of the clearance of a blister and realize it. In the case of a blister according to the invention, with a hydraulic pressure chamber and membrane wall, this is possible by simply presetting the hydraulic pressure in the pressure chamber or the difference in pressure with respect to the pressure in the extrusion space.

The invention is explained in more detail below on the basis of exemplary embodiments in the drawing.

DETAILED DESCRIPTION OF THE PRESENTLY PREFERRED EMBODIMENTS

Figure 1:
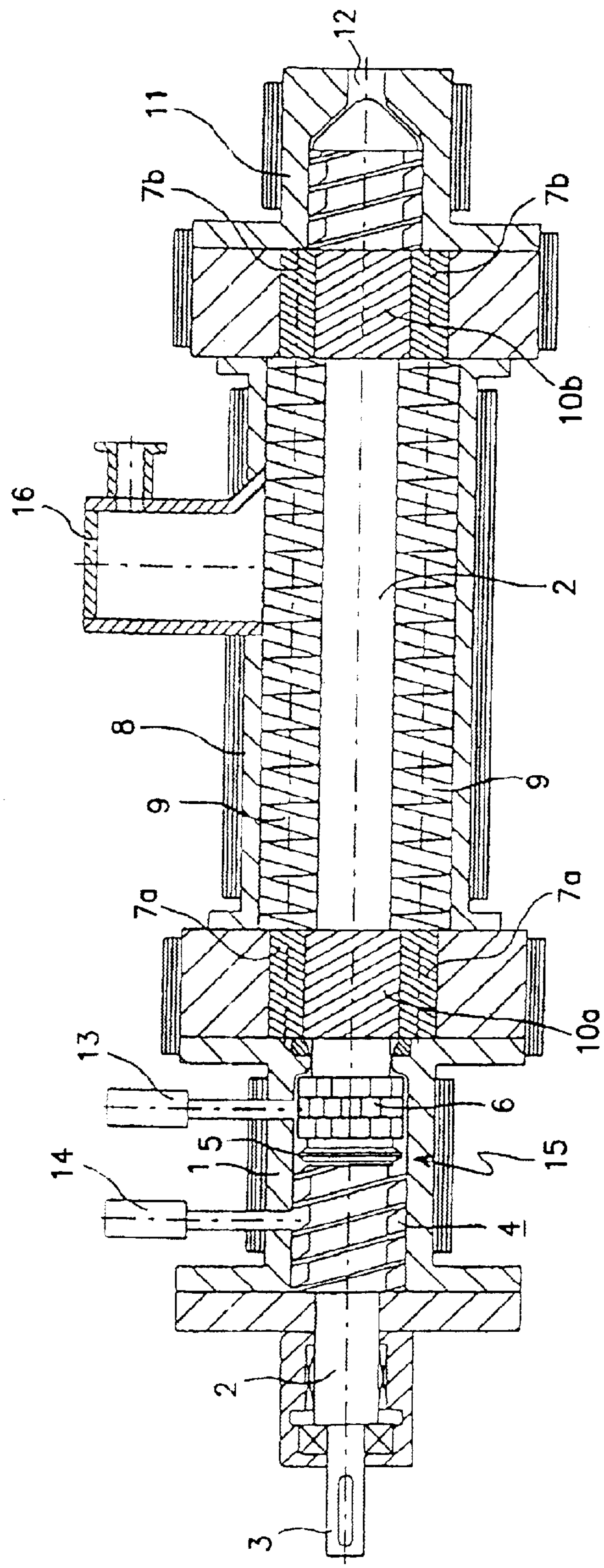
FIG. 1 shows a schematic representation of an extruder with a planetary-gear extruder section arranged in the middle part.

The schematic representation of the extruder in FIG. 1 shows an extruder barrel which is passed through by a screw shank 2 over virtually the entire axial length. The screw shank 2, provided with a journal 3 with fitting key, is rotationally driven by a motor (not represented) via a gear mechanism (likewise not represented). The barrel section 1 which directly adjoins the gear mechanism and the cylindrical surface of which essentially corresponds in diameter to the outside diameter of the screw of the screw shank 2 encloses a part of the extrusion space 4. The barrel section 1 is provided with a connecting piece of a melt feed 14. Consequently, the extruder represented is fed the material to be processed not in the form of granules or powder but in an already molten form. Directly following the screw of the screw shank 2 there is also arranged in the barrel section 1 a blister 15, which forms a restricted flow zone, so that the part of the extrusion space 4 lying upstream of the blister 15 is always completely filled with melt. The blister 15 includes a circumferential bulge formed by a short section 5 on the screw shank 2 in the form of a cylinder casing adjoined on both sides by short frustoconical regions 5*a*, 5*b* of the screw shank 2. This design of the blister 15 is discussed in still more detail further below.

Arranged downstream of the blister 15 in the barrel section 1 is the connecting piece of an entraining-agent feed 13, through which water, for example, can be jetted into the extrusion space 4 and consequently into the melt. The screw shank 2 is designed downstream of the blister 15 as a so-called porcupine 6, i.e. is provided with spike-like mixing elements protruding radially from the screw shank 2. In this region of the extrusion space 4 there is therefore considerable formation of bubbles in the melt. The melt then passes into a planetary-gear extruder section 8, two of the planetary spindles 9 of which can be seen in the representation. The planetary spindles 9 are respectively mounted at their ends in the planetary gears 7*a*, 7*b* of a planetary gear mechanism, the sun gears of which are denoted by 10*a* and 10*b*. The sun gears 10*a*, 10*b* constitute part of the screw shank 2. A stripping of the melt takes place in the region of the planetary-gear extruder section 8. The gases released can escape through a vent 16. Following the planetary-gear extruder section 8, there is in turn a zone 11 of a single-screw extruder in which the degassed melt is brought to the required extrusion pressure and is forced out through an extrusion die 12.

Figure 2:
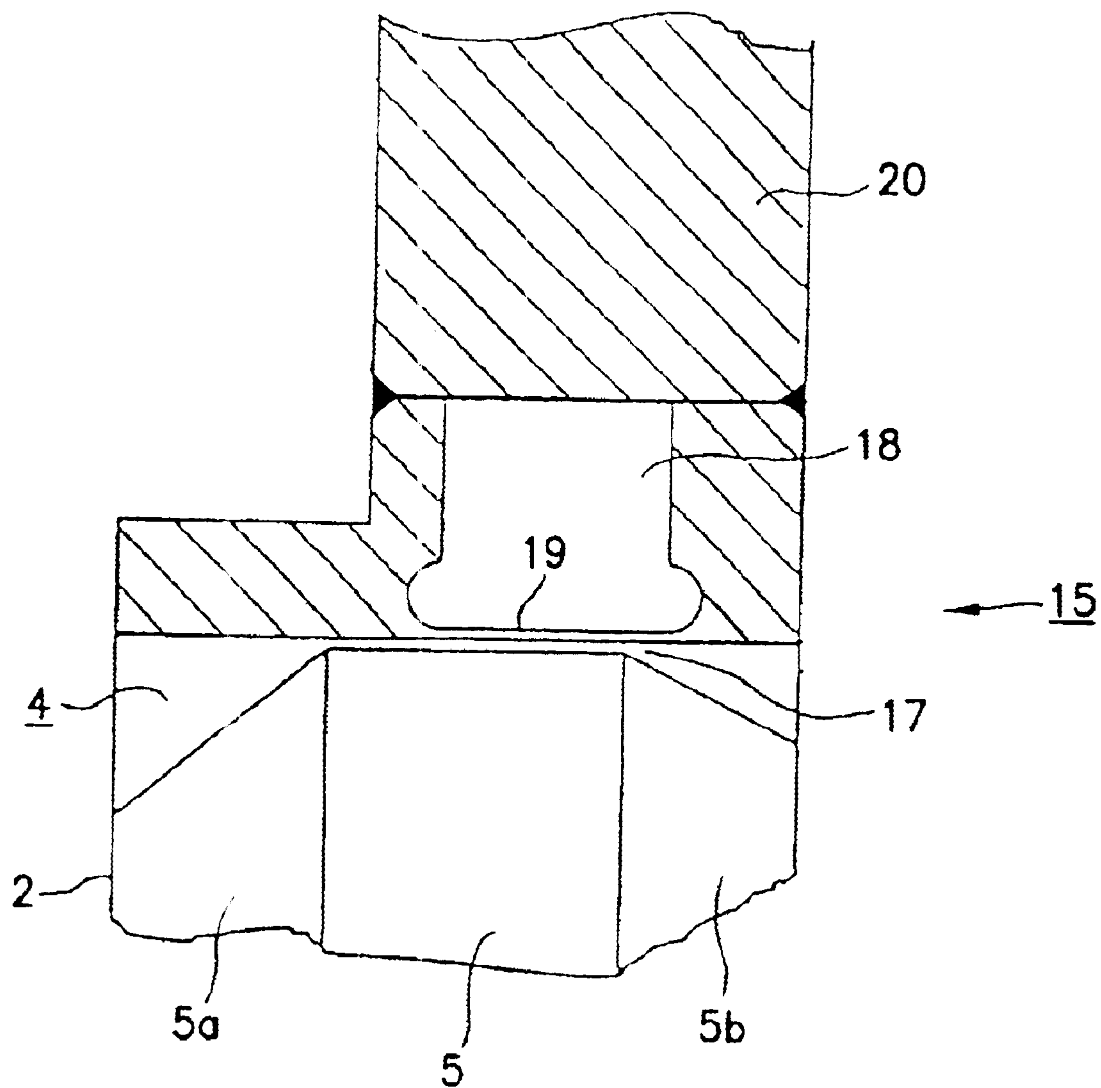
FIG. 2 shows a schematic representation of a detail of a blister with a hydraulic pressure chamber.

FIG. 2 shows a detail of the region of the blister 15 designed according to the invention, as a section along the extruder axis. Of the screw shank 2, only the circumferential bulge having the section 5 in the form of a cylinder casing, with two frustoconical regions 5*a*, 5*b* directly adjoining it, is represented. The annular barrel part 20 of the blister 15 with the hydraulic pressure chamber 18 is designed as a short separate part of the barrel. The pressure chamber is formed by a welded structure which is composed of two parts. The outer annular part is made as a solid component, while the hydraulic pressure chamber 18 has been machined into the inner annular part, for example by a turning operation. By inserting the two annular parts one into the other and welding right around the annular joining gap on both sides, the pressure chamber 18 is completely sealed from the outside. The hydraulic pressure medium can be introduced into the pressure chamber 18 through a supply line that is not represented in the sectional diagram. Toward the extrusion space 4, the pressure chamber 18 has a wall, which is referred to as membrane wall 19 and has an extremely small wall thickness in comparison with the wall thickness of the extruder barrel. Formed between the surface of the section 5 in the form of a cylinder casing of the circumferential bulge of the screw shank 2 and this membrane wall 19 is a relatively small annular gap, which has for example a size of 2 or 3 mm. The size of this annular gap 17 is of great importance for the setting of the melt pressure. Even relatively small changes in the clearance have a very noticeable effect. In order that the screw shank 2 lies exactly coaxially in this annular gap 17, and in the extrusion space 4, it is generally necessary to mount the screw shank 2 not in a cantilevered manner but at both ends. The introduction of a hydraulic medium under increased pressure into the pressure chamber 18 allows the membrane wall 19 to be deformed in the direction of the screw shank 2. The membrane wall 19 bows out downward in the axial longitudinal section represented. Seen in cross section with respect to the longitudinal axis, this means that the inside diameter of the extrusion space 4 is reduced in the region of the membrane wall, and so the annular gap 17 of the blister is likewise reduced. Since the pressure of the pressure medium can be changed within broad limits, but every pressure change is only accompanied by comparatively small changes in the deformation of the membrane wall 19, the effective clearance in the annular gap 17 can be set extremely accurately. The control effort required for this can be described as small.

Figure 3A:
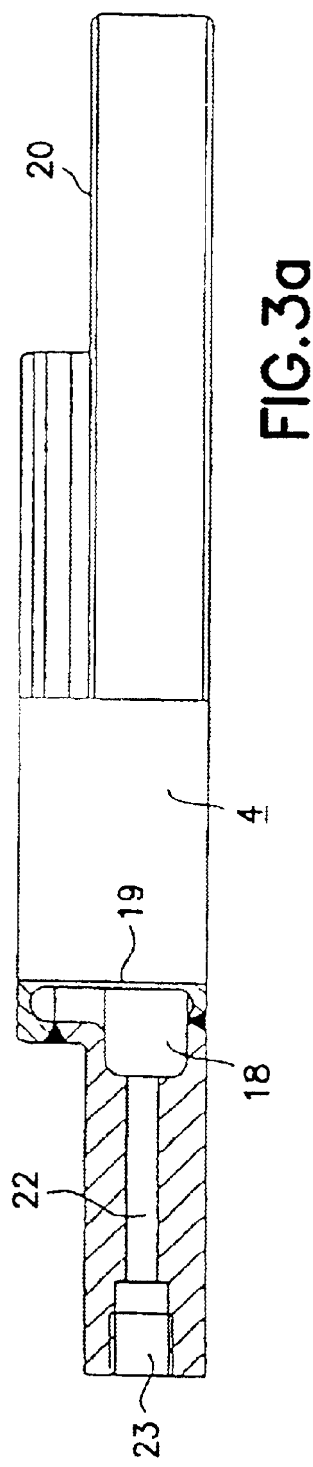
FIG. 3*a* shows a part of the barrel with a hydraulic pressure chamber in partial axial section.
Figure 3B:
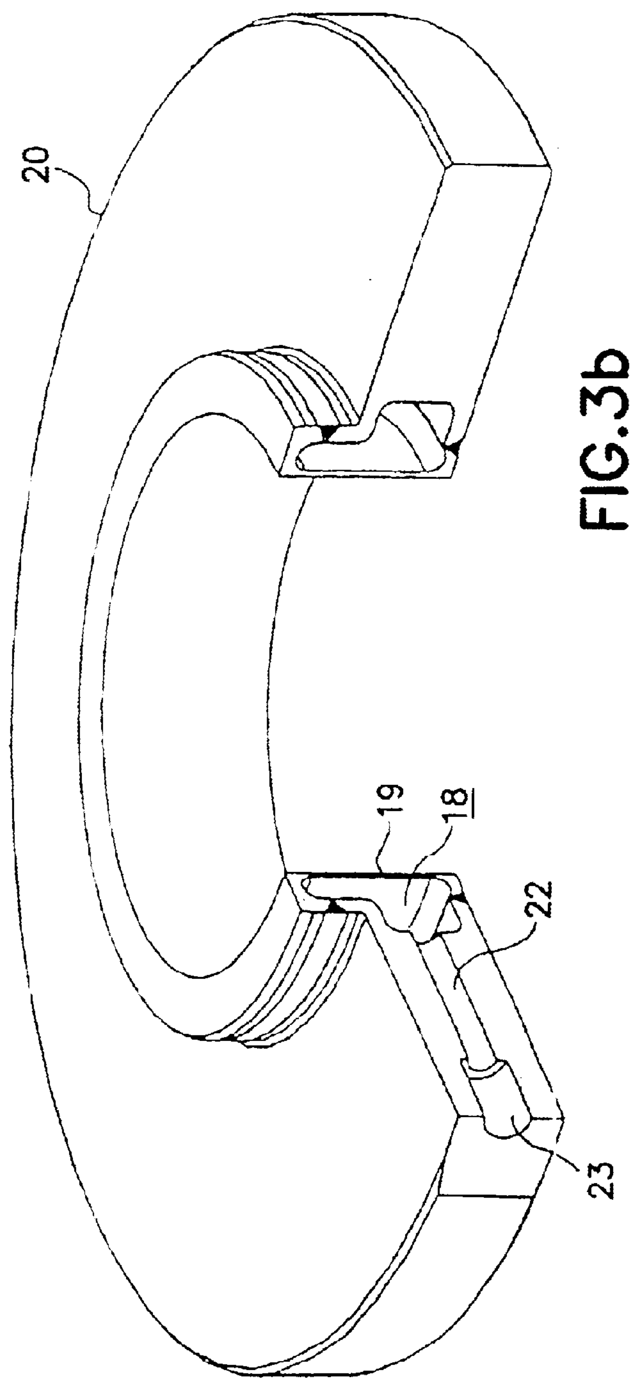
FIG. 3*b* is a cutaway perspective of the barrel part.

FIGS. 3*a* and 3*b* show, by way of example, the barrel part 20 for a blister according to the invention in a realistic form with regard to the relative size. The barrel part 20 is designed essentially in an annular or disk-shaped form. The cylindrical opening lying around the region of the center axis is part of the extrusion space 4. In the outer region, the barrel part 20 is provided in the manner of a flange with through-bores (not represented), to permit fastening to the adjoining parts of the extruder barrel in a simple way. As distinct from the embodiment in FIG. 2, the annular pressure chamber 18 with the membrane wall 19 is not shaped mirror-symmetrically in the axial longitudinal section, but instead has a cross-sectional form resembling a shoe. This makes it possible to extend the pressure chamber 18 into the region of the offset pointing to the right of the otherwise disk-shaped barrel part 20. In this case as well, the pressure chamber 18 is formed as a welded structure. The welds are arranged in such a way that they lie in thicker-walled regions of the barrel part 20 and not in the direct vicinity of the membrane wall 19. To supply the pressure chamber 18 with hydraulic medium, a thread for a hydraulic connection 23 is provided on the outside of the barrel part 20 and is for its part connected to the pressure chamber 18 via a channel 22. In the present case, the inside diameter of the extrusion space 4 is approximately 90 mm, while the thickness of the membrane wall 19 is around 1 mm and the length of the pressure chamber or of the associated barrel part 20 is around approximately 30 mm.

Figure 4:
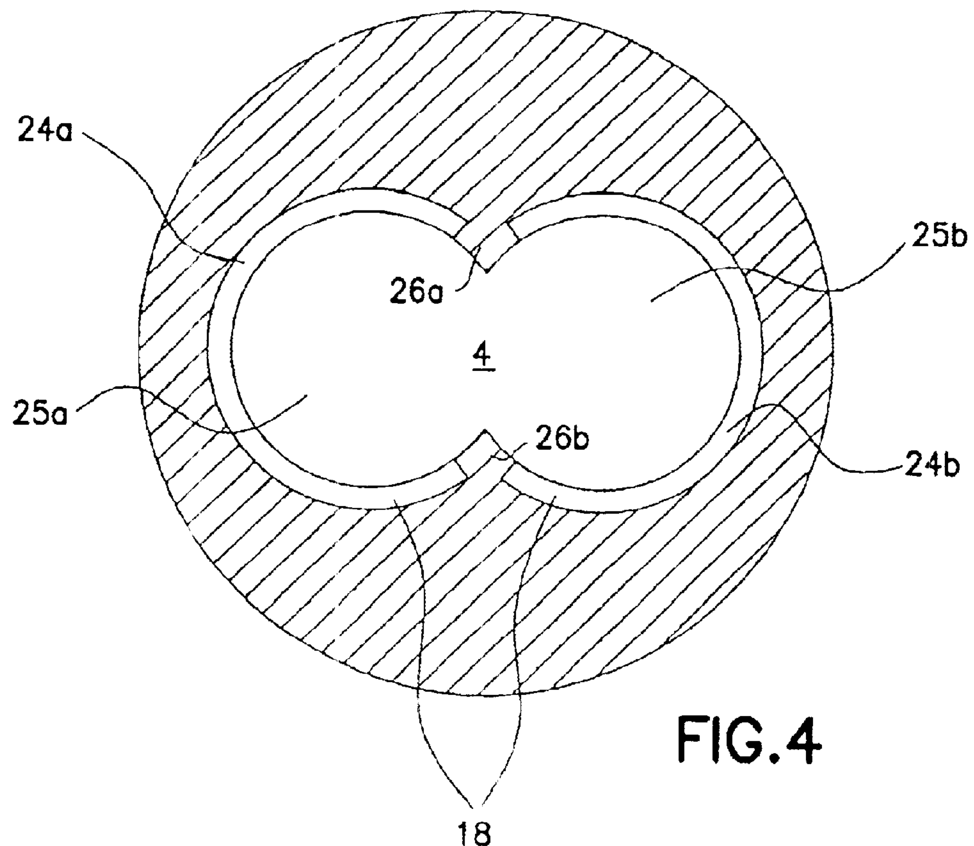
FIG. 4 shows a cross section through the extruder barrel of a twin-screw extruder according to the invention and FIG. 5 shows a modification of the embodiment of FIG. 4.

Represented in FIG. 4 is a schematic section through the barrel of a twin-screw extruder, the extrusion space 4 of which is formed by the partially overlapping longitudinal bores 25a,b. The two extruder screw shanks are not represented. The hydraulic pressure chamber 18 is not formed all the way round the inside surface of the extrusion space 4 but instead is composed of the two chambers 24a, b, which are partitioned off from each other and respectively extend over by far the greater part of the circumference of the longitudinal bore 25a and 25b, respectively. Only the two interstitial regions 26a,b of the spectacle-bore are not taken up by the hydraulic pressure chamber 18. Consequently, when the hydraulic pressure chamber 18 is activated, only a relatively small part of the surface of the extrusion space in the region of the blister is excluded from the attempted deformation. However, this has virtually no adverse effects on the process control in the twin-screw extruder.

Figure 5:
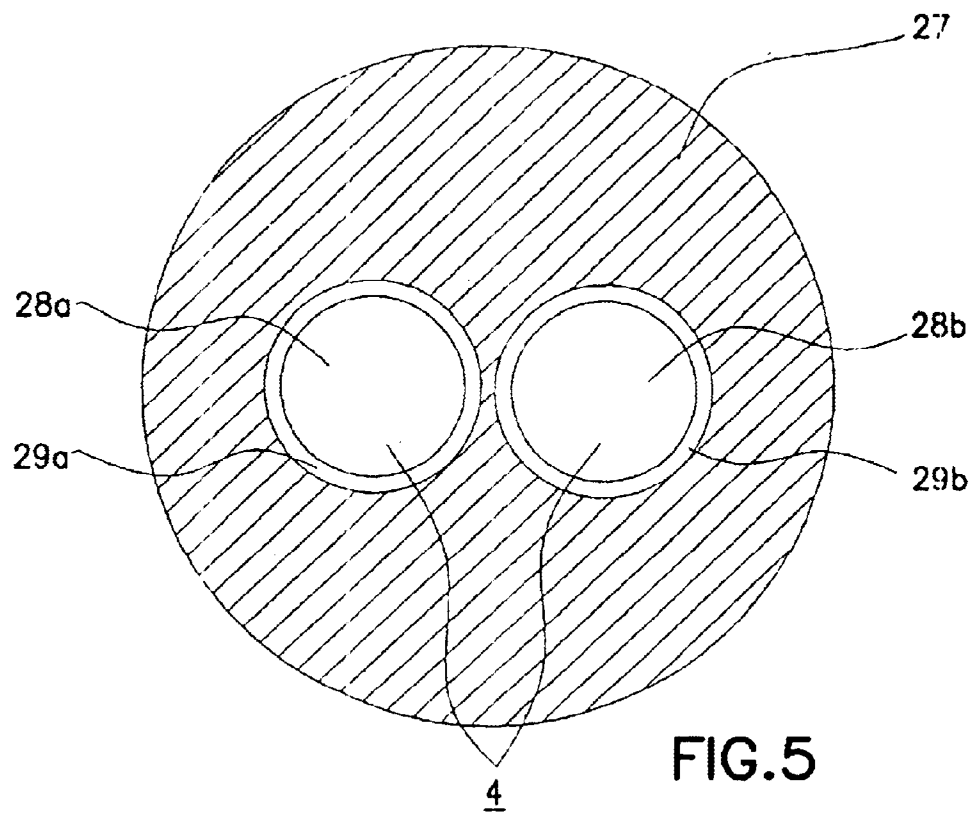

A particularly advantageous modification of the embodiment of FIG. 4 is represented in FIG. 5. In this case, instead of the two overlapping longitudinal bores 25a, b, the twin-screw extruder is provided over part of its axial length, in a special barrel section 27, with fully cylindrical, that is to say not overlapping, longitudinal bores 28a, b, arranged in an appropriately coaxial manner in relation to the spectacle-bore. In a way similar to that represented in FIGS. 2 and 3 for a single-screw extruder, a completely encircling pressure chamber 29a, b is respectively arranged in these longitudinal bores 28a, b. As in FIG. 4, the hydraulic supply line is not represented.

What is claimed is:

1. An extruder comprising at least one extruder screw shank which can be rotated by a motor, said screw shank having a part provided with flights, said part having a diameter, said screw shank further having at least one circumferential bulge section with a diameter which is larger than the diameter of the part provided with flights, an extruder barrel through which said at least one screw shank extends to form an extrusion space between said screw shank and said extruder barrel, said extruder barrel having at least one barrel section which surrounds in an essentially equidistant manner the respective at least one screw shank in the area of the respective at least one circumferential bulge section to form an encircling gap as a restricted flow zone, and a hydraulic pressure chamber formed in at least one of said screw shank and said barrel in the area of said restricted flow zone, said at least one of said screw shank and said barrel being formed with a membrane wall between said pressure chamber and said restricted flow zone, said membrane wall being deformable in a selective manner to adjust the size of the gap by adjusting the pressure in said pressure chamber.

2. An extruder as in claim 1 wherein said extruder is a single-screw extruder having a single screw shank, said encircling gap being an annular gap.

3. An extruder as in claim 1 wherein said extruder is a twin-screw extruder having two driven extruder screw shanks arranged in parallel, said extruder barrel being formed with two cylindrical bores which receive respective said screw shanks, said bores having overlapping cross sections over at least part of the length of the extruder barrel.

4. An extruder as in claim 3 wherein said hydraulic pressure chamber comprises two separate chambers arranged mirror-symmetrically in relation to each other in said barrel section, said chambers being separated from each other by interstitial spaces where said bores overlap.

5. An extruder as in claim 1 wherein said hydraulic pressure chamber is provided in said barrel section.

6. An extruder as in claim 1 wherein said extruder is a twin-screw extruder having two driven extruder screw shanks arranged in parallel, said extruder barrel being formed with two filly cylindrical bores which receive respective said screw shanks, two said hydraulic pressure chambers being provided in said barrel, each said hydraulic pressure chamber completely encircling a respective said longitudinal bore.

7. An extruder as in claim 6 wherein said longitudinal bores each have a diameter which is only slightly greater than the root diameter of the respective said screw shank.

8. An extruder as in claim 1 wherein the barrel comprises a separately formed disk-like barrel part in which said hydraulic pressure chamber is arranged.

9. An extruder as in claim 1 wherein said barrel comprises an inner part and an outer part which are welded together to form said pressure chamber in said barrel.

10. An extruder as in claim 9 wherein said inner part comprises a membrane wall, said inner part and said outer part being welded together at welds located outside of said membrane wall.

11. An extruder as in claim 1 wherein said membrane wall is designed to withstand a pressure difference of at least 100 bar between said pressure chamber and said restricted flow zone.

12. An extruder as in claim 11 wherein said membrane wall is designed to withstand a pressure difference of at least 150 bar between said pressure chamber and said restricted flow zone.

13. An extruder as in claim 1 wherein said membrane wall has a thickness in the range of 0.5 to 3 mm.

14. An extruder as in claim 13 wherein said membrane wall has a thickness in the range of 1 to 2 mm.

15. An extruder as in claim 1 comprising at least one multi-screw extruder section downstream of said restricted flow zone.

16. An extruder as in claim 15 wherein said multi-screw extruder section comprises a planetary gear extruder section.

17. An extruder as in claim 1 wherein said circumferential bulge comprises a cylindrical section.

18. An extruder as in claim 17 wherein said circumferential bulge further comprises a pair of frustoconical sections adjoining said cylindrical section.

* * * * *

UNITED STATES PATENT AND TRADEMARK OFFICE

CERTIFICATE OF CORRECTION

PATENT NO. : 6,705,753 B2
DATED : March 16, 2004
INVENTOR(S) : Michael Behling

It is certified that error appears in the above-identified patent and that said Letters Patent is hereby corrected as shown below:

Title page,
Item [73], Assignee, should read: -- Berstorff GmbH, Hanover (DE) --

Signed and Sealed this

Twelfth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,705,753 B2
DATED : March 16, 2004
INVENTOR(S) : Michael Behling

It is certified that error appears in the above-identified patent and that said Letters Patent is hereby corrected as shown below:

Title page,
Item [73], Assignee, should read: -- Berstorff GmbH, Hannover (DE) --

This certificate supersedes Certificate of Correction issued April 12, 2005.

Signed and Sealed this

Second Day of August, 2005

JON W. DUDAS
*Director of the United States Patent and Trademark Office*